Figure 1:
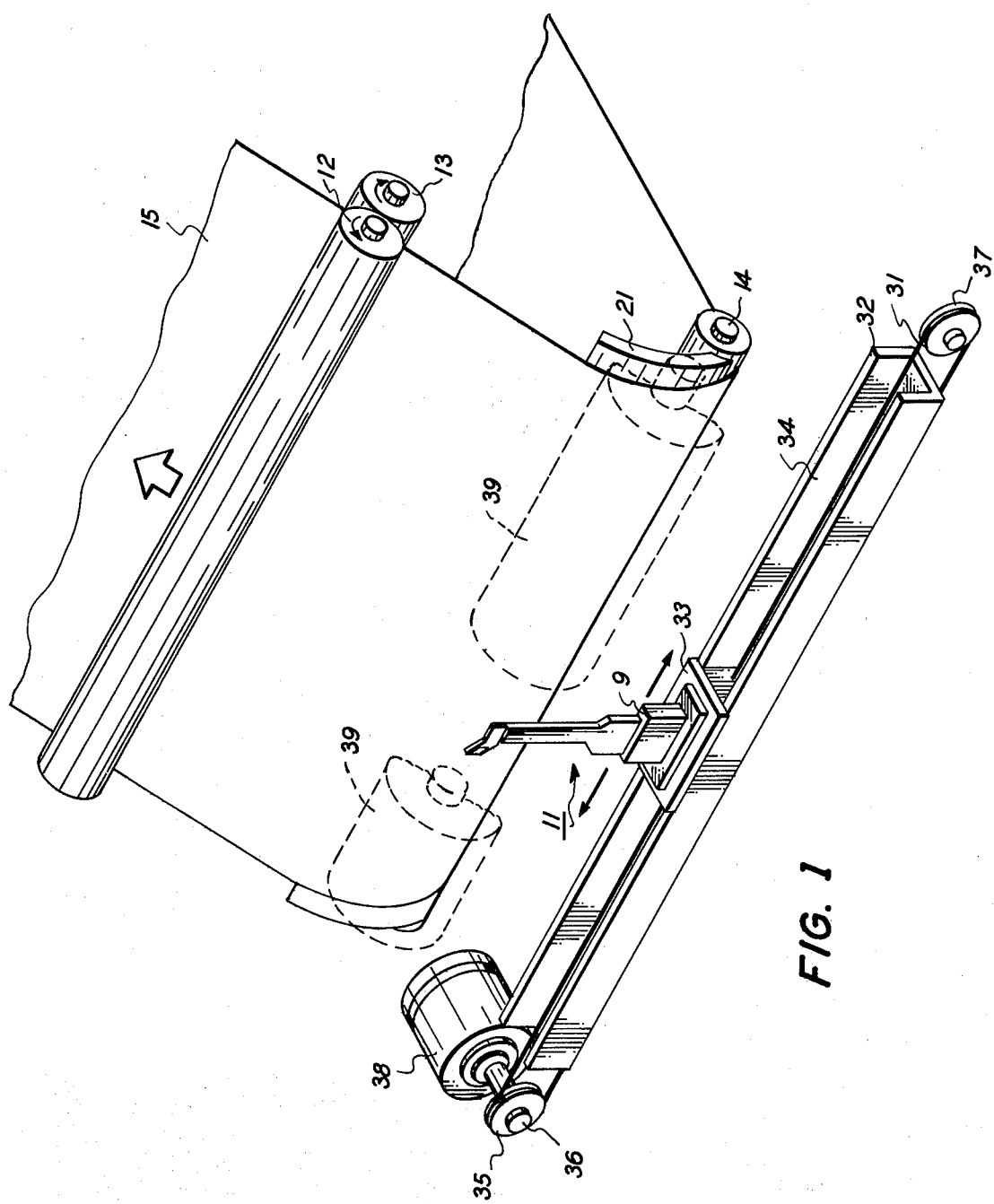

United States Patent [19]
Ring

[11] 3,971,042
[45] July 20, 1976

[54] WRITING APPARATUS HAVING WEAR RESISTANT MATERIAL

[75] Inventor: Howard D. Ring, Rochester, N.Y.

[73] Assignee: Xerox Corporation, Stamford, Conn.

[22] Filed: Oct. 12, 1972

[21] Appl. No.: 297,107

Related U.S. Application Data

[63] Continuation of Ser. No. 14,138, Feb. 25, 1970, abandoned.

[52] U.S. Cl............................................. 346/139 C
[51] Int. Cl.²........................................ G01D 15/06
[58] Field of Search............ 346/139 C, 74 ES, 74 E, 346/74 CH, 74 S, 74 SB, 74 SC

[56] References Cited
UNITED STATES PATENTS

| | | | |
|---|---|---|---|
| 2,346,675 | 4/1944 | Hackenberg et al. | 346/139 C |
| 3,267,485 | 8/1966 | Howell et al. | 346/139 C |
| 3,291,276 | 12/1966 | Milne et al. | 346/139 C X |
| 3,478,191 | 11/1969 | Johnson et al. | 346/76 X |
| 3,644,930 | 2/1972 | Stange et al. | 346/74 ES |
| 3,673,600 | 6/1972 | Damouth et al. | 346/74 ES |
| 3,694,574 | 9/1972 | Gray et al. | 346/139 C X |

*Primary Examiner*—Joseph W. Hartary

[57] ABSTRACT

A stylus and its method of manufacture for forming an image on the recording medium of a printing apparatus having the structure of a substrate upon which a plurality of conductors are etched or printed. The writing edge of the stylus containing the pin electrodes formed by the conductors has a chip of wear resistant or hard material laminated to the substrate to prevent excessive wear of the pin electrodes. Alternately, the substrate itself is made of a wear resistant or hard material to prevent wear of the pin electrodes.

1 Claim, 5 Drawing Figures

WRITING APPARATUS HAVING WEAR RESISTANT MATERIAL

This application is a continuation of applicaton, Ser. No. 14,138 filed Feb. 25, 1970, now abandoned. This applicaton is related to Ser. No. 213,761 now U.S. Pat. no. 3,795,010 filed Dec. 29,1971, as a division of Ser. No. 14,138.

This invention relates to printing apparatus and more particularly to a wear resistance or hard stylus for a printing apparatus and a method for making such a stylus.

BACKGROUND OF THE INVENTION

In electrographic recording an electrostatic charge is deposited directly on an insulating or recording medium in a pattern or image corresponding to the charges applied to the pin electrodes. Generally, the styli are in contact with the recording medium and an electrostatic charge is deposited on the recording medium by the electric field established between the styli and a ground plate conventionally called a platen located at the opposite side of the record medium. The deposition of a charge on the recording medium leaves marks or dots thereon which when properly combined form the data to be printed. The insulating medium may be a plastic coated paper, pre-dried paper or any other dielectric sheet capable of maintaining a high resistance and holding an electrostatic charge for a useful period of time. In order to form a visible rendering of the electrostatic image it is necessary to develop the image with electroscopic powder or toner. A toner is selected so that it will be charged to a polarity opposite to that of the electrostatic image. When this toner is deposited upon the charged surface, the image exerts a force of attraction on the toner and retains the toner in the charged areas. Subsequently the toner may be fused into the recording medium making a permanent record.

In most styli printing apparatus the styli have limited life due to the wear of the pin electrodes as they are swept across the recording medium. Consequently, the styli must be replaced periodically adding to the expense of operation of the printer. Many attempts have been made to obtain styli which have longer life in order to reduce frequent replacement. However, these attempts have either resulted in complete failure or in increased fabrication costs.

One way of obtaining long lasting styli is to make the conductors as hard as possible. This approach creates problems of fabricaton because hard materials such as tungsten, tungsten carbide, nickel-tungsten, hard chromium, stainless steel or beryllium-copper are difficult to place on etched copper conductors. Attempts to do so result in cracking of the plating on the writing tips or in shorting of the electrode conductors because of the close spacing of the etched pattern.

Accordingly, it is an object of this invention to provide a stylus for a printing apparatus which has long life, is inexpensive and easy to fabricate.

It is another object of this invention to increase the life of a stylus employed in a printing apparatus by a novel method of manufacture involving overlaying the writing edge with a wear resistant or hard material.

It is yet another object of this invention to increase the life of a stylus by forming the writing edge on a wear resistant or hard substrate.

BRIEF DESCRIPTION OF THE INVENTION

The stylus made in accordance with the invention is a copper pattern etched or printed on glass epoxy material, a commonly known printing circuit board substance. To this configuration the chip of wear resistant or hard material is laminated at the writing edge to form the long lived stylus. Other variations of fabricating a long lived styli include etched or printed conductors on a substrate of wear resistant or hard material. Styli made in conformity with the invention are not only inexpensive and simple to fabricate but have a useful life of more than double conventionally fabricated styli.

Figure 2:
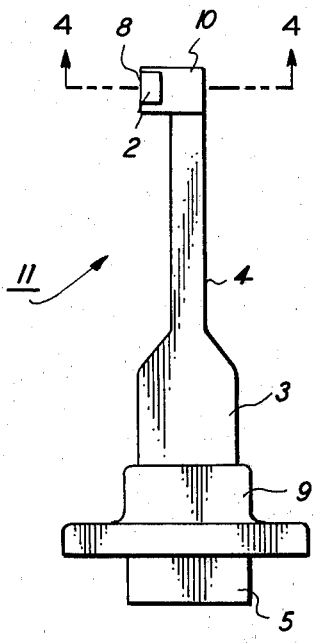
Figure 3:
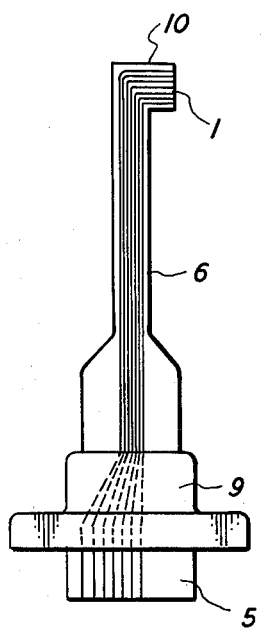
Figure 5:
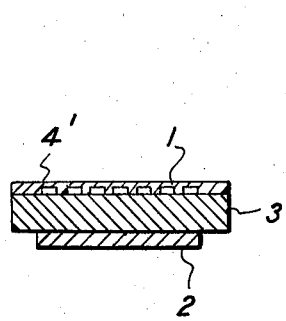
Figure 4:
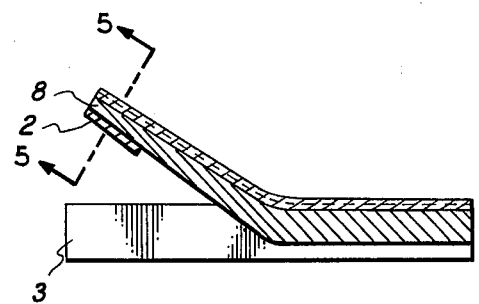

These and further objects of the present invention will be more fully understood by reference to the description which follows and the accompanying drawings wherein:

FIG. 1 is a vastly simplified view of an electrographic printing apparatus utilizing a stylus made in the manner of the invention, FIG. 2 is a left side elevational view of the improved stylus showing a wear resistant chip laminated to the writing edge, FIG. 3 is a right side elevational view of the stylus showing the spaced conductors on the substrate, FIG. 4 is a view taken along the line 4–4 of FIG. 2 showing the details of the stylus writing edge, FIG. 5 is a view taken along the line 5–5 of FIG. 4 showing the laminations on the substrate.

Referring now to the drawing for a more detailed description of the present invention and specifically to FIG. 1, a stylus designated 11 is shown mounted on a molded base or support member 9. Base member 9 is in turn mounted upon carriage assembly 33 in a socket (not shown) which conveys electrical signals to the conductors of the stylus. Carriage assembly 33 carrying stylus 11 traverses laterally in slot 34 of guide bar 32 by movement of cable 31 to which the carriage assembly is connected. Cable 31 is frictionally engaged to rotate about drive pulley 35 and idler pully 37. Drive pulley 35 is driven by motor 38 through shaft 36 so that the carriage assembly 33 moves in printing alignment with recording medium 15 from left to right and in synchronism with input data to stylus 11 and the engagement of motor 38. That is, stylus 11 prints data on recording medium 15 controlled in time and space by input circuits not shown but conventional in the art such as a character generator and a timing pulse generator. The recording medium 15, as stated above, may be a plastic coated paper, pre-dried paper or any suitable dielectric sheet. The writing surface of platen 21 also serves as a backing electrode so that an electric field is established between the pin electrodes of the stylus and the platen depositing a charge on the recording medium in the form of marks or dots. The platen is generally maintained at ground potential but may have a bias voltage and the pin electrodes may have a voltage applied to them in the range of 600–1000 volts. The recording medium may be advanced over guide roller 14 by drive rollers 12 and 13 in a stepwise manner so that when the carriage assembly reaches the farthest right hand position and moves to the left hand position, the recording medium has advanced a sufficient amount so that a new line of information may be recorded. Means such as limit switches at the lateral extremes of the carriage positions may be provided to signal the end of the traverse of the carriage at the lateral extremes.

In the foregoing explanation of the stylus and printing apparatus it is assumed that stylus 11 impresses an electrostatic image on the recording medium. In such event, development of the image is completed by applying a toner by a fiber brush 39 shown in broken outline to the recording surface immediately after depositing the electrostatic image thereon or soon thereafter. Application of the toner renders the image visible.

It is understood that the above description of the stylus in an electrographic printer does not limit the improved stylus of the invention solely to this type of printer. The improved stylus of this invention can be utilized wherever a long lived writing stylus is needed and is not intended to be restricted to sole use in electrographic recording devices.

Referring to FIGS. 2–5, there is shown in more detail the improved stylus of the invention. The molded base 9 of stylus 11 is made of an insulating material into which the terminal end 5 of the stylus is permanently mounted. The writing end 10 of stylus 11 is spaced from the terminal end 5 and base 9 by a reduced shaft portion 4. The writing end is generally L-shaped having pin electrodes 1 aligned to simultaneously contact the recording medium. Part 2 is a ceramic chip which is laminated onto substrate 3 at the writing edge 8 and provides the wear resistant or hard surface when aligned with pin electrodes 1.

FIG. 3 shows in elevation a plurality of conductors 6 which may be etched or printed on substrate 3 and which run along the length of the substrate to form the writing end 10 and terminal end 5. Although the number of conductors and pin electrodes are shown as seven, it is understood that a matrix of pin electrodes exceeding that number may be obtained by stacking several basic substrates together. Such a construction of pin electrodes in a matrix is within the purview of the invention.

FIG. 4 is a view taken along the line 4—4 of FIG. 2 and shows the detail of the writing edge 8. It is to be understood from FIG. 4 that the rate of wear is determined solely by the wear resistant or hard material and not the pin electrodes which the wear resistant material protects.

FIG. 5 is a view taken along the line 5—5 of FIG. 4 and shows in detail the structure of the writing edge. Reference number 4' is a layer of insulating material such as an acrylic plastic resin known as Humiseal made by Columbia Technical Corp., of Woodside, N.Y. that electrically isolates pin electrodes 1 from each other and prevents sparking. Substrate 3 may be a plastic such as a glass epoxy G-10 made by General Electric Co., Syracuse, N.Y. used conventionally in printed circuit fabrication. On the side opposite pin electrodes 1 of substrate 3 is a chip 2 of wear resistant or hard material which may comprise an aluminum oxide or any other suitable wear resistant material. Aluminum oxide chip 2 has a thickness of 0.005 inch ± 0.001 incl, a width of 0.093 inch±0.010 inch and a length of 0.125 inch±0.010 inch A wear resistant or hard material according to the invention means a material having a degree of hardness shown by its resistance to cutting, scratching or abrasion. The Moh Hardness Scale is a system in which all solid substances are grouped in order of increasing hardness so that the hardness of any particular substance may be expressed by a number. On the Moh Hardness Scale talc is assigned the integer 1 and diamond, the hardest material, is assigned the integer 15. Tungsten carbide is assigned the number 12 and fused alumina the number 13. In practice of the invention the wear resistant material is chosen such that its hardness is greater than the hardness of the conductor material.

The wear resistant stylus of the invention is inexpensive and easy to fabricate. Several styli may be made simultaneously by printing or etching copper patterns having a terminal end and a pin electrode end on a G-10 glass epoxy printed circuit board material. The next step is to coat the board with a dielectric material such as plastic resin. The coating should then be allowed to cure and may be baked in an oven for approximately one half hour. However, the cure time and temperature depend upon the specific plastic resin utilized. The outlines including the writing edge of the styli are then separated and machined. The plastic body or base is then molded around the connector end of the stylus. Heat is next applied to the tip or writing end of the stylus to bend it away from the main body portion and then a piece of wear resistant ceramic such as aluminum oxide is laminated with a suitable glue to the back side of the writing edge of the stylus. Finally, the continuity of conductors of the stylus is checked for electrical shorts and high voltage breakdown. Where pin electrode matrices are to be fabricated several of the substrates formed as described above may be stacked one upon the other in registration.

Other methods of fabrication may include depositing conductors on a ceramic substrate or etching patterns on a thin glass epoxy substrate laminated to a harder substrate made of a ceramic or a carbide. In these methods of fabrication the substrate itself is the wear resistant material.

From the foregoing, a stylus fabricated to have a long life and use in a printing apparatus has been described.

What is claimed is:

1. A stylus for forming images on the recording medium of a printing apparatus comprising:
    a base adapted to be inserted in a connector socket of said printing apparatus to receive control signals, one end of said stylus mounted on said base,
    a writing edge formed at the free end of said stylus, and
    a chip of wear resistant material attached to the free end of said stylus initially on the side opposite from the writing edge whereby said writing edge is eventually protected from excessive wear in sweeping across said recording medium.

* * * * *